Aug. 30, 1955     E. R. LOWE     2,716,554
EQUALIZING AND LOCATING JAW DEVICE FOR GEARS
Filed Oct. 16, 1952     3 Sheets-Sheet 1
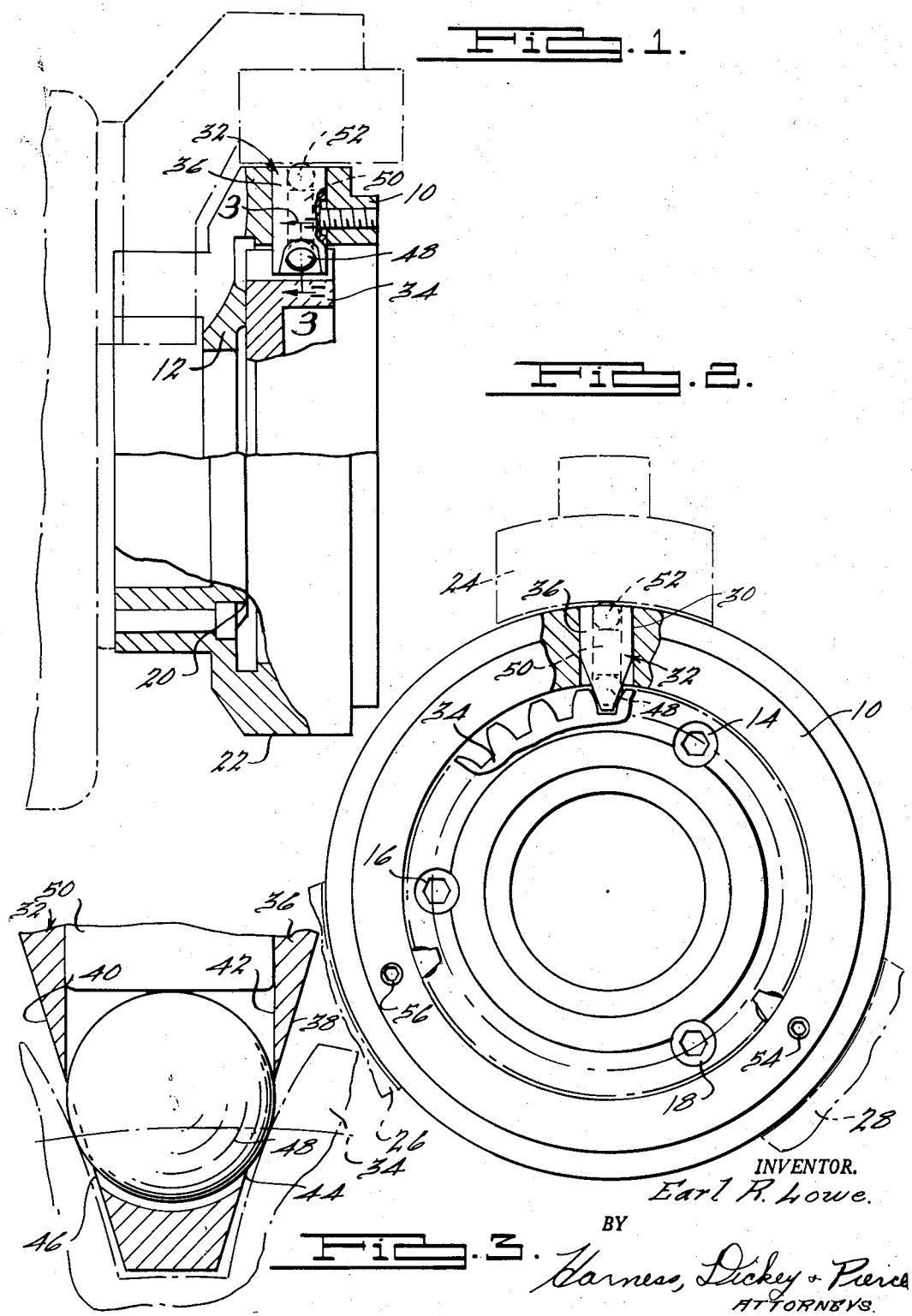
INVENTOR.
Earl R. Lowe.
BY
Harness, Dickey & Pierce
ATTORNEYS.

Aug. 30, 1955  E. R. LOWE  2,716,554
EQUALIZING AND LOCATING JAW DEVICE FOR GEARS
Filed Oct. 16, 1952  3 Sheets-Sheet 2

INVENTOR.
Earl R. Lowe
BY
Harness, Dickey & Pierce
ATTORNEYS.

Aug. 30, 1955 E. R. LOWE 2,716,554
EQUALIZING AND LOCATING JAW DEVICE FOR GEARS
Filed Oct. 16, 1952 3 Sheets-Sheet 3

INVENTOR.
Earl R. Lowe.
BY
Harness, Dickey & Pierce.
ATTORNEYS.

United States Patent Office 2,716,554
Patented Aug. 30, 1955

2,716,554

EQUALIZING AND LOCATING JAW DEVICE FOR GEARS

Earl R. Lowe, East Detroit, Mich.

Application October 16, 1952, Serial No. 315,065

14 Claims. (Cl. 279—1)

This invention relates to a holding device and, more particularly, to a device adapted to hold and locate or center gear workpieces so that the theoretical pitch diameter is concentric to the axis of rotation of the gear.

An object of the invention is to provide means for accurately locating, holding, and checking gear workpieces with a minimum of labor and expense.

Another object of the invention is to provide a device having spherical gear contacting elements adapted to rotate during loading and unloading operations thereby obviating the tendency of the gear contacting elements to wear unevenly and increasing the holding, locating, and checking accuracy.

Another object of the invention is to provide a device having gear contacting elements that may be readily removed and cheaply replaced.

Another object of the invention is to provide means permitting a conventional chuck to be quickly and economically adapted to locate and hold gears of various types and sizes within the capacity of the particular chuck.

Still another object of the invention is to provide means for checking the gear pitch diameter which permits the use of relatively inexpensive cylindrical setting masters.

Still another object of the invention is to provide a device in which the gear contacting elements are laterally, angularly and axially movable so that each contacting element positively contacts the gear teeth adjacent thereto and compensates for heat treat and/or manufacturing distortions to gear teeth.

Conventional gear locating and holding devices require a separate, relatively expensive chuck for each type or size of gear, the jaws of each chuck being differently spaced circumferentially so that the locating and holding elements may be properly positioned to engage the teeth of each type or size of gear. Relatively expensive interchangeable cage devices have also been used having specially designed gear pin jaws adapted to fit a particular gear. However, there has been a common objection to such prior devices in that they are costly; require a relatively long set-up time since they must be accurately aligned with the axis of the spindle; and often require special mountings. Accordingly, another object of the present invention is to overcome the disadvantages present with devices of the type referred to and to provide a relatively inexpensive device which may be readily adapted to accurately locate and hold gear workpieces of various types and sizes so that in the mass production of gears a plurality of such relatively inexpensive devices may be utilized to locate and hold gear workpieces in a conventional chuck thereby eliminating the necessity of maintaining a large supply of the relatively expensive chucks or cages.

A still further object of the invention is to provide an improved device of the above described type which is simple in construction, economical of manufacture, durable, efficient and reliable in operation.

In the accomplishment of these objects, the present invention provides a device having radially extending, movable spherical elements adapted to positively contact the teeth of a gear adjacent said elements, substantially at the pitch line of the gear, so as to automatically locate and securely hold the gear while machining, checking, or other operations are performed thereon. While the invention may be adapted to locate and hold or check either external or internal gears, for the purposes of illustration, the embodiments shown in the accompanying drawings are shown as adapted to locate and hold or check external gears.

Other objects and advantages of the invention will be apparent from the following detailed description thereof when read in conjunction with the accompanying drawings wherein:

Figure 1 is a side elevational view of one form of the invention, with portions broken away in section, as applied to a conventional diaphragm chuck;

Fig. 2 is a front view, with portions broken away in section, of the embodiment shown in Figure 1;

Fig. 3 is an enlarged sectional view taken on the line 3—3 of Figure 1;

Figure 4:
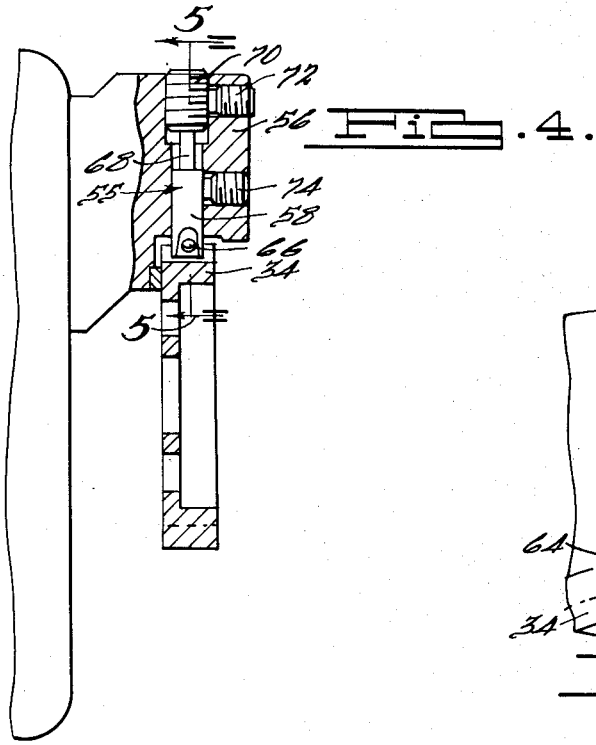
Fig. 4 is a fragmentary, side view partially in section and partially in elevation of another form of the invention.

Referring to the drawings, one embodiment of the invention is illustrated in Figures 1 and 2 and is comprised of a substantially cylindrically shaped housing or cage 10 having an end wall 12, and means, such as the circumferentially spaced set screws 14, 16, and 18, engage threaded openings in the forward face 20 of a conventional diaphragm chuck 22 to releasably secure the housing or cage 10 to the chuck and to prevent rotation thereof relative to the chuck jaws 24, 26, and 28. A plurality of equally circumferentially spaced, radially extending passageways 30 are formed in the side walls of housing 10 and a holding member generally designated 32 is detachably fitted and positioned in each of the passageways at the same distance radially from the axis of the housing. It will be appreciated that the relative positioning of the holding members will vary with the particular type and size of the gear being held. Each holding member cooperates with the holding members in the other passageways to locate and hold the gear workpiece 34 upon which machining operations, for example, boring or face grinding, are to be performed. Each holding member is comprised of a retainer 36 which slidably fits the aforementioned passageways. The radially inner end portion of said retainer is closed and tapered, diametrically opposed surfaces 38 and 40 are formed thereon. Retainer 36 is also provided with a substantially axial bore 42 which intersects the tapered surfaces 38 and 40 so as to form diametrically opposed openings 44 and 46 therein. The bore 42 is formed with a drill or other boring means having a hemispherical bottoming portion so that the radially inner end portion of the bore is of hemispherical configuration and adapted to retain a spherical member 48. As best shown in Figure 3, the openings 44 and 46 are sufficiently large to permit the periphery of the spherical member 48 to project partially therethrough and to permit the spherical member to move laterally, axially and angularly with respect to the axis of the bore 42, within limits defined by the openings. It will, of course, be apparent that the retainer 36 could be formed integral with the cage 10 with the bore 42 formed in such integral retainer.

A pin 50, which acts as a seat for the spherical member 48, is positioned in the bore 42 between the spherical member 48 and a second spherical member 52 which is rotatably fitted in the radially outer end portion of the bore 42 and abuts the curved surface of chuck jaw 24. It will be appreciated that the spherical members 48 and 52 can be readily manufactured so as to have excellent wearing qualities and that the spherical member 52 will make a substantially point contact with the jaw 24 so as to prevent cocking of the holding member 32 and to insure that the jaw pressure will be applied axially through the pin 50 to the spherical member 48.

Each holding member is releasably locked in the radially adjusted position by set screws such as 54 and 56 which are threaded in the forward face of the housing 10.

It will be apparent that a plurality of gear locating and holding devices of the type described above may be utilized in the mass production of gears to facilitate locating and holding gear workpieces, of various types and sizes, in a conventional chuck so as to eliminate the necessity of maintaining a large supply of relatively expensive chucks which would otherwise be required in order to hold various types and sizes of gears.

In the operation of this embodiment of the invention, a gear workpiece 34 is placed concentrically in the housing 10 so that each spherical member 48 enters between the surface of adjacent teeth. The jaws of the chuck are then closed by any suitable means so as to engage the spherical members 52 and apply pressure thereto. Spherical members 52 coact with the interposed pins 50 to transmit the pressure to the spherical members 48. As previously mentioned, the spherical members 48 are movable laterally, axially and angularly with respect to the pins 50 and will automatically move until they contact the surfaces of both the adjacent gear teeth. Such an arrangement is provided to insure positive contact with the gear teeth adjacent the spherical members 48 in the event the teeth spacing varies from the normal spacing and it will be apparent that the radially disposed spherical members 48 cooperate so as to automatically center the gear workpiece in the jaws of the chuck. It will be appreciated that the alignment of the axis of the cage with the axis of the spindle is not critical since the movement of the spherical members and interposed pin will automatically equalize the chuck jaw pressure so as to accurately locate the gear workpiece.

Figure 5:
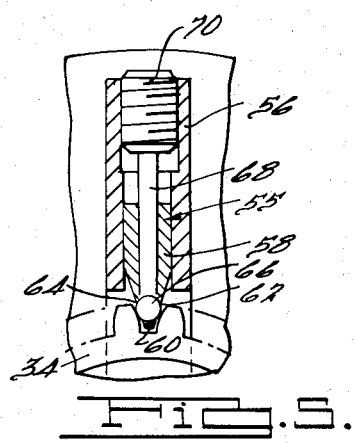
Fig. 5 is a sectional view taken on the line 5—5 of Figure 4.

Another embodiment of the invention is illustrated in Figures 4 and 5 and is comprised of holding members such as 55 which are fitted in radially disposed passageways formed in the jaws 56 of a conventional chuck. Each holding member is comprised of a sleeve member 58 having a wedge-shaped head portion 60. Diametrically opposed openings 62 and 64 are formed in the tapered surfaces of the head portion by using a tool similar to the tool previously described and a spherical member 66 is fitted in the head portion, the periphery of the spherical member partially projecting through the openings which are sufficiently large to permit the spherical member to move laterally with respect to the axis of the sleeve 58. A pin 68 which acts as a seat for the spherical member 66 is positioned in the sleeve 58 and an abutment stop screw 70 is fitted in the passageway formed in the jaw 56 at the radially outer end portion thereof and serves to radially position the holding member. Each abutment stop screw 70 is releasably locked in the radially adjusted position by means of the set screw 72 threaded through the forward face of the jaw and each sleeve is similarly locked in the desired position by set screw 74 which also serves to prevent rotation of the sleeve. In this embodiment of the invention, the radially inner end of the abutment stop screw 70 is flat rather than arcuate and the radially outer end of the pin 68 is also flat to prevent cocking of the pin and to insure that the jaw pressure will be applied axially through the pin 68 to the spherical member 66.

Figure 6:
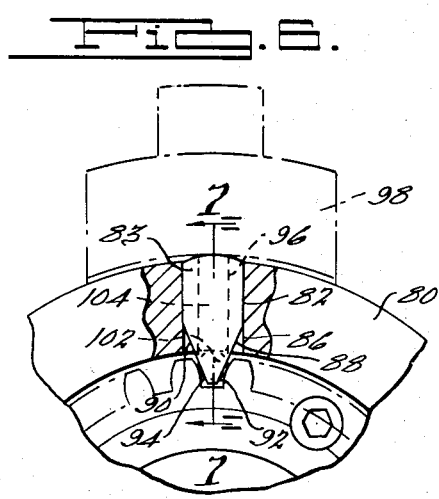
Fig. 6 is a fragmentary, front view of another form of the invention, with portions in section.
Figure 7:
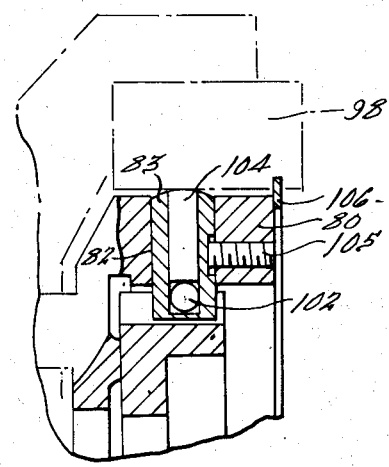
Fig. 7 is a sectional view taken on the line 7—7 of Figure 6.
Figure 8:
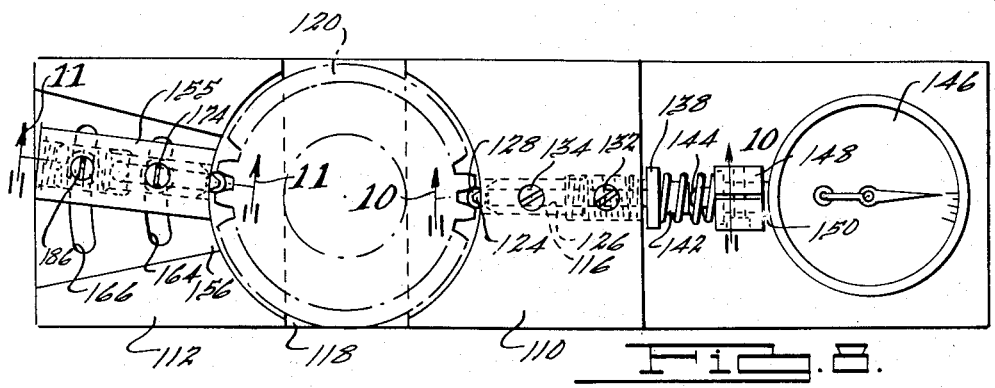
Fig. 8 is a plan view of still another form of the invention.
Figure 9:
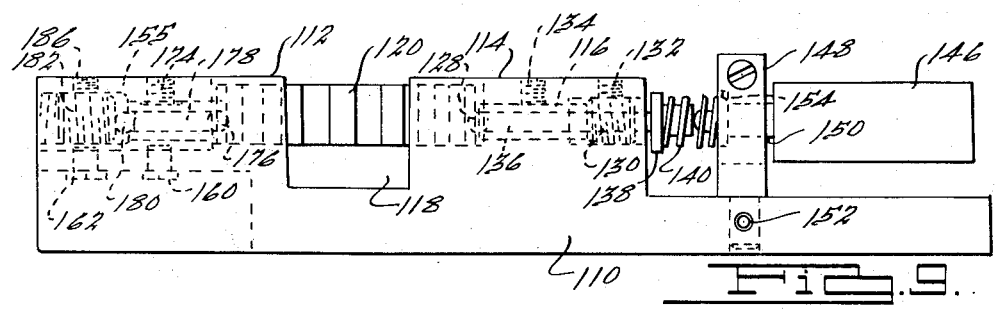
Fig. 9 is a side elevational view of the form of the invention shown in Fig. 8.

Another embodiment of the invention is illustrated in Figures 6 and 7 and is comprised of a housing 80 having equally spaced, radially extending passageways, such as 82, formed therein, similar to the passageways formed in the housing shown in Figure 1. A holding member 83 is detachably fitted in each of the passageways at the same distance radially from the axis of the housing and serve to hold and locate the gear workpiece during machining operations. The holding member is comprised of a retainer 86 one end of which is closed, the same end portion having tapered diametrically opposed surfaces 88 and 90. Openings 92 and 94 are formed in the tapered surfaces and communicate with an axial bore 96 provided in the retainer 86. The other end of the retainer is formed in a partially spherical shape, the curvature having a smaller radius than the radius of the curved surfaces of the jaws 98. A spherical member 102 is rotatably fitted in the bore 96 and the periphery of the spherical member partially projects through the openings 92 and 94, the openings being sufficiently large to permit the spherical member to move laterally with respect to the axis of the retainer. A pin 104 which acts as a seat for the spherical member 102 is fitted in the bore 96 and abuts the inner surface of the radially outer end of the retainer. Retainer 86 is releasably locked in the radially adjusted position by set screw 105 which also prevents rotation of the retainer. The housing 80 is detachably secured intermediate the jaws of the chuck by a snap ring 106 so that housing 80 floats in the jaws of the chuck.

It will be appreciated that the embodiments illustrated in Figures 4, 5, 6, and 7 will operate in substantially the same manner with substantially the same benefits as the construction first described and while these embodiments of the invention have been shown applied to a diaphragm chuck having an odd number of jaws, it will, of course, be understood that this is merely illustrative and that the invention may be equally applied to any conventional chuck.

Figure 10:
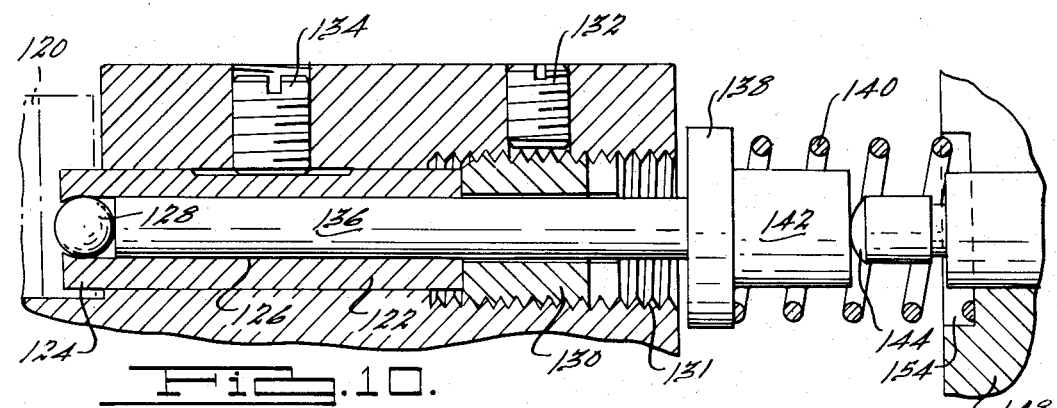
Fig. 10 is a sectional view taken on the line 10—10 of Fig. 8.

Still another embodiment of the invention is illustrated in Figures 8, 9, 10 and 11, particularly adapted for use in checking the pitch diameter of gears, and is comprised of a substantially rectangular base 110 having raised portions 112 and 114. A horizontally extending passageway 116 is provided in the raised portion 114 and communicates with a recess 118 provided for receiving a gear workpiece 120. As best shown in Figure 10, a sleeve member 122, having a wedge-shaped head portion 124, is slidably fitted in the passageway 116, the end of the head portion being peened or otherwise shaped so as to reduce the diameter of the bore 126. A spherical member 128 is fitted in the head portion, the periphery of the spherical member partially projecting beyond the tapered surfaces of the head portion and also partially projecting beyond the end of the head portion. It will be appreciated that such a construction permits the spherical member to move laterally, axially, and angularly, with respect to the axis of the bore 126.

For the purpose of positioning the sleeve member in the passageway 116, a nut 130 is threadably fitted in the threaded counterbore 131, provided at the outer end portion of the passageway, the nut being releasably secured by the set screw 132 while the sleeve is releasably secured by the set screw 134.

A spring biased pin member 136, which acts as a seat for the spherical member 128, passes through the nut 130 and is slidably fitted in the bore 126, with the inner end abutting the spherical member. At a position near, but spaced from, the outer end of the pin member 136, an enlarged shoulder portion 138 is provided which serves as an abutment for the spring 140 while the portion 142 extending beyond the shoulder is enlarged and abuts the hemispherically shaped contact head 144 of a conventional dial indicator 146. From the above description it will be appreciated that such as arrangement insures positive contact with the gear teeth adjacent the spherical member 128 and prevents cocking of the pin 136.

Dial indicator 146 is releasably secured to the base 110 by means of the clamp 148 which encompasses the forwardly extending sleeve 150 of the indicator, the lower end of the clamp being attached to the base by screw 152. Clamp 148 is also provided with a recess 154 adapted to receive the other end of the spring 140.

Figure 11:
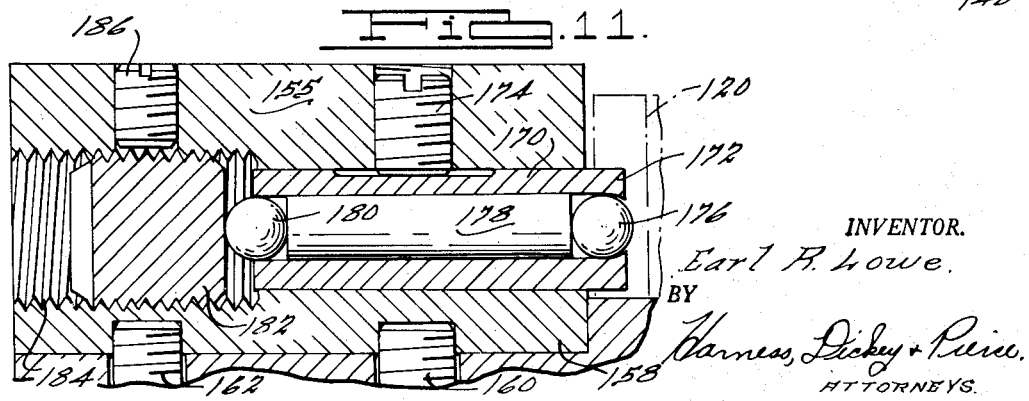
Fig. 11 is a sectional view taken on the line 11—11 of Fig. 8.

At a position substantially opposite the inner end of the passageway 116, a tapered recess 156 is provided in the raised portion 112 adapted to accommodate an adjustable abutment stop generally designated 155. As best seen in Figure 11, abutment stop 155 is comprised of an outer sleeve 158 which may be moved laterally, axially, and angularly relative to the base 110 and is releasably secured to the base by means of the screws 160 and 162 which pass through the arcuate slots 164 and 166. A second sleeve or retainer 170 having a tapered, wedge-shaped head portion 172 is slidably fitted with the bore of the sleeve 158 and releasably secured by set screw 174, the end of the head portion 172 being peened or otherwise shaped so as to reduce the diameter of the bore.

A spherical member 176 is fitted in the head portion with the periphery partially projecting beyond the tapered surfaces of the head portion and also partially projecting beyond the end of the head portion. Pin member 178 which acts as a seat for the spherical member 176 is fitted in the bore between the spherical member 176 and a second spherical member 180 rotatably fitted in the outer end portion of the bore. An abutment stop nut 182 is threadably fitted in the threaded counterbore 184 provided in the sleeve and serves to axially position the sleeve member, the nut being releasably secured by means of set screw 186. It will be appreciated that the spherical member 180 will make a substantially point contact with the stop nut 182 so as to prevent cocking of the pin member 178.

In the operation of this form of the invention to check the pitch diameter of a particular gear, the sleeve 170 is adjusted so that the spherical member 176 will enter between the surfaces of adjacent teeth on one side of the gear while the spherical member 128 enters between adjacent teeth on the other side of the gear. In order to set the dial indicator 146, a cylindrical setting master is positioned in the recess 118, the dial indicator being set by positioning the sleeve members 122 and 170 so that the forwardly protruding portions of the spherical members 128 and 176 abut the surface of the setting master. It will be appreciated that the present invention obviates the necessity of using conventional, relatively expensive, specially configured setting masters and permits the use of relatively inexpensive cylindrical setting masters to set the dial indicator since the forward portions of the spherical members 128 and 176 abut the setting master rather than the side portions of the spherical members. The dimension checked by the indicator will, of course, be the dimension commonly known as the diameter over pins or rolls.

After removing the setting master, a gear 120 is placed in the recess 118 so that each spherical member 128 and 176 enters between the surfaces of adjacent teeth. It will be noted that the spherical members rotate during the loading and unloading operations thereby obviating the tendency of the spherical members to wear unevenly.

The pressure of the spring 140 will then be applied through pin 136 to the spherical members and force them into intimate contact with the surfaces of adjacent gear teeth. Since the spherical members 128 and 176 are free to move laterally, axially, and angularly, as previously mentioned, positive contact with adjacent teeth is assured so that the dial indicator abutting the enlarged portion 142 of the pin 136 will accurately check the pitch diameter.

While preferred embodiments of the invention have been shown and described, it will, of course, be understood that various changes and modifications may be made without departing from the spirit and scope of the invention.

What is claimed is:

1. In combination with a chuck having a plurality of jaws, means for locating and holding a gear workpiece in said chuck, said means comprising a plurality of sleeve members each sleeve member having opposed tapered surfaces on one end portion thereof and an axial bore communicating with diametrically opposed openings in each of said tapered surfaces, a first spherical member rotatably fitted in said sleeve member and partially projecting through said openings, said openings having sufficient diameter to permit said first spherical member to move laterally with respect to the axis of said sleeve, a second spherical member rotatably fitted in the opposite end portion of said bore, and a pin member interposed between said first spherical member and said second spherical member, said holding means being adapted to hold a gear workpiece substantially at the pitch line thereof.

2. In combination with a chuck having a plurality of jaws, means for locating and holding a gear workpiece in said chuck, said means comprising a plurality of sleeve members, each sleeve member having opposed tapered surfaces on the radially inner end portion thereof and an axial bore communicating with diametrically opposed openings in each of said tapered surfaces, a first spherical member rotatably fitted in said sleeve member and partially projecting through said openings, said openings having sufficient diameter to permit said first spherical member to move laterally with respect to the axis of said sleeve, a second spherical member rotatably fitted in the radially outer end portion of said bore and abutting one of said jaws, a pin member interposed between said first spherical member and said second spherical member, said holding means being adapted to hold a gear workpiece substantially at the pitch line thereof.

3. In combination with a chuck provided with a plurality of jaws having radially extending passageways formed therein, means for locating and holding a gear workpiece, said means comprising a plurality of sleeve members each having a hollow wedge-shaped head portion, one of said members fitted in each of said passageways, each of said members having diametrically opposed openings in the tapered surfaces of said head portion of each of said members and a ball rotatably fitted in said head portion, partially projecting through said openings, said balls adapted to move laterally with respect to the longitudinal axis of the associated sleeve member, abutment means for radially adjusting said sleeve members in said passageways, means for locking said abutment means in the adjusted position, and means for locking said sleeve members in said passageways.

4. In combination with a chuck provided with a plurality of jaws having arcuate gripping surfaces, means for locating and holding a gear workpiece in said chuck, said holding means comprising a substantially cylindrical housing having equally spaced radially extending passageways formed in the side walls thereof, a plurality of sleeves each having diametrically opposed tapered surfaces on one end portion thereof, one of said sleeves fitted in each of said passageways, each of said sleeves having opposed openings in said tapered surfaces communicating with the bore thereof, a ball rotatably fitted in each of said sleeves, and partially projecting through said openings, each of said balls adapted to move laterally with respect to the longitudinal axis of the associated sleeve, a seat for each of said balls fitted in each of said sleeves, the other end of each of said sleeves having an arcuate surface of smaller radius than the radius of the arcuate surface of said jaws, and means for releasably locking said sleeves in said passageways.

5. A device for holding and locating a gear workpiece in the jaws of a chuck, said device comprising a cylindrical housing closed at one end thereof and having equally spaced, radially extending passageways formed in the walls thereof, holding means fitted in each of said passageways, said holding means comprising a sleeve member having opposed tapered surfaces on one end portion thereof, openings in each of said tapered surfaces communicating with the bore of said sleeve, a first ball rotatably fitted in said bore and partially projecting through said openings, a second ball rotatably fitted in the opposite end of said bore, and a pin member interposed between said first ball and said second ball.

6. A device for holding and locating a gear workpiece in the jaws of a chuck, said device comprising a cylindrical housing closed at one end and having equally spaced, radially extending passageways formed in the side walls thereof, holding means fitted in each of said passageways, said holding means comprising a sleeve member having opposed tapered surfaces on the radially inner end portion thereof, openings in each of said tapered surfaces communicating with the bore of said sleeve, a first ball rotatably fitted in said bore and partially projecting through said openings, a second ball rotatably fitted in the radially outer end portion of said bore, a pin member interposed between said first ball and said second ball, and means for detachably securing said housing in the jaws of a chuck.

7. A device for checking gears comprising a base having a recess adapted to receive a gear, a pair of elongate retainers each defining a longitudinally extending bore, said retainers adjustably secured to said base on opposite sides of said recess, a ball in the bore of each of said retainers, the bore at one end portion of each of said retainers being reduced in diameter, said end portion also provided with opposed tapered surfaces having diametrically opposed openings formed therein, said balls partially projecting through said openings and beyond said reduced portion said balls adapted to move laterally with respect to the longitudinal axis of the associated sleeve, and a pin fitted in the bore of each of said retainers for transmitting pressure to said balls.

8. A device for checking gears comprising a base, a pair of checking elements in angular spaced relationship with respect to each other adjustably secured to said base, each of said checking elements comprising an elongate retainer defining a longitudinally extending bore, the bore at one end portion of each of said retainers being reduced in diameter, said end portion also having wedge-shaped surfaces provided with diametrically opposed openings communicating with a said bore, a ball in the bore of each of said retainers and retained by said wedge-shaped surfaces, said balls partially projecting through said openings and beyond said reduced portion, said balls adapted to move laterally with respect to the longitudinal axis of the associated retainer, and a pin fitted in the bore of each of said retainers for transmitting pressure to said balls.

9. A device for checking gears comprising a base, a pair of checking elements in angular spaced relationship with respect to each other adjustably secured to said base, each of said checking elements comprising a retainer, the bore at one end portion of said retainer being reduced in diameter, said end portion also having wedge-shaped surfaces provided with diametrically opposed openings communicating with a substantially axial bore, a ball retained by said wedge-shaped surfaces partially projecting through said openings and beyond said reduced portion, a spring biased pin member slidably fitted in one of said retainers and abutting said ball, a second ball fitted in the other of said retainers, and a pin interposed between said first ball and said second ball.

10. In an equalizing and locating jaw device for gears, the combination comprising a plurality of elongate angularly spaced retainers each defining a longitudinally extending bore, a ball in the bore of each of said retainers, one end portion of each of said retainers being tapered and having opposed openings formed therein communicating with the bore thereof, said balls partially projecting through said openings and adapted to move laterally with respect to the longitudinal axis of the associated retainer, and a pin fitted in the bore of each of said retainers for transmitting pressure to said balls.

11. In an equalizing and locating jaw device for gears, the combination comprising a plurality of elongate angularly spaced retainers each defining a longitudinally extending bore, a ball in the bore of each of said retainers, one end portion of each of said retainers provided with opposed tapered surfaces having diametrically opposed openings formed therein, the bore of said end portion being reduced in diameter at the outer end thereof, said balls partially projecting through said openings and beyond said reduced bore portions, said balls also adapted to move laterally with respect to the longitudinal axis of the associated retainer, and a pin fitted in the bore of each of said retainers for transmitting pressure to said balls.

12. In an equalizing and locating jaw device for use in chucks, the combination comprising a plurality of elongate angularly spaced retainers each defining a longitudinally extending bore, a ball in the bore of each of said retainers, one end portion of each of said retainers provided with opposed tapered surfaces having diametrically opposed openings formed therein, the bore of said end portion being closed at the outer end thereof, said balls partially projecting through said openings and adapted to move laterally with respect to the longitudinal axis of the associated retainer, and a pin fitted in the bore of each of said retainers for transmitting pressure to said balls.

13. In a device for checking gears, the combination including a base, a plurality of checking elements in angularly spaced relationship with respect to each other and adjustably secured to said base, each of said checking elements comprising an elongate retainer defining a substantially axially extending bore, one end portion of each of said retainers having tapered surfaces provided with opposed openings communicating with said bore, a ball in the bore of each of said retainers, said balls being retained by said tapered surfaces, said balls partially projecting through said openings and adapted to move laterally with respect to the longitudinal axis of the associated retainer, and a pin fitted in the bore of each of said retainers for transmitting pressure to said balls.

14. A device for centering gears in a chuck comprising a housing, a plurality of centering elements in angularly spaced relationship with respect to each other in the walls of said housing, each of said centering elements comprising an elongate retainer defining a longitudinally extending bore, one end portion of each of said retainers having wedge-shaped surfaces provided with diametrically opposed openings communicating with said bore, a ball in the bore of each of said retainers, said balls being retained by said wedge-shaped surfaces, said balls partially projecting through said openings and adapted to move laterally with respect to the longitudinal axis of the associated retainer, and a pin fitted in the bore of each of said retainers for transmitting pressure to said balls.

References Cited in the file of this patent

UNITED STATES PATENTS

| 1,036,994 | Garvin et al. | Aug. 27, 1912 |
| 2,511,954 | Telfor et al. | June 20, 1950 |
| 2,568,585 | Hohwart et al. | Sept. 18, 1951 |